(12) United States Patent
Hori et al.

(10) Patent No.: US 8,075,447 B2
(45) Date of Patent: Dec. 13, 2011

(54) VEHICLE CONTROL SYSTEM AND METHOD

(75) Inventors: Masashi Hori, Anjo (JP); Shinji Takeuchi, Nukata-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 891 days.

(21) Appl. No.: 12/078,109

(22) Filed: Mar. 27, 2008

(65) Prior Publication Data

US 2008/0242506 A1 Oct. 2, 2008

(30) Foreign Application Priority Data

Mar. 28, 2007 (JP) ................................ 2007-085241

(51) Int. Cl.
*B60W 10/04* (2006.01)
*B60W 10/10* (2006.01)
(52) U.S. Cl. ........................ 477/110; 477/101
(58) Field of Classification Search .................. 477/101, 477/107, 110, 111, 183, 184, 203, 209, 210
See application file for complete search history.

(56) References Cited

U.S. PATENT DOCUMENTS

| | | | | |
|---|---|---|---|---|
| 4,449,495 A | * | 5/1984 | Fiala | 123/198 DB |
| 5,562,568 A | * | 10/1996 | Smale | 477/99 |
| 5,592,856 A | * | 1/1997 | Parsons | 74/473.3 |
| 6,445,084 B1 | | 9/2002 | Daiss et al. | |
| 6,500,092 B2 | | 12/2002 | Syamoto | |
| 6,712,736 B2 | * | 3/2004 | Scarlata | 477/99 |
| 6,899,213 B1 | * | 5/2005 | Lohss | 192/220.3 |
| 2001/0006922 A1 | | 7/2001 | Scarlata | |
| 2001/0026212 A1 | | 10/2001 | Strohbeck | |

FOREIGN PATENT DOCUMENTS

| | | |
|---|---|---|
| DE | 10 002 441 | 8/2001 |
| JP | 62-122826 | 6/1987 |
| JP | 03-6840 | 2/1991 |
| JP | 11-247675 | 9/1999 |

(Continued)

OTHER PUBLICATIONS

Japanese Office Action dated Feb. 2, 2010, issued in corresponding Japanese Application No. 2007-085241, with English translation.

(Continued)

*Primary Examiner* — Justin Holmes
(74) *Attorney, Agent, or Firm* — Nixon & Vanderhye P.C.

(57) ABSTRACT

A vehicle control system including a range selector having a shift lever operated by a driver of a vehicle, a shift control device for controlling the switching of a shift range of an automatic transmission of the vehicle in accordance with the range selecting operation of the shift lever, and an engine control device for controlling the switching of ON/OFF of an internal combustion engine of the vehicle in accordance with an engine switch operation of the shift lever.

4 Claims, 6 Drawing Sheets

FOREIGN PATENT DOCUMENTS

| | | |
|---|---|---|
| JP | 11-301305 | 11/1999 |
| JP | 2000-168389 | 6/2000 |
| JP | 2001-207884 | 8/2001 |
| JP | 2001-334846 | 12/2001 |
| JP | 2002-254951 | 9/2002 |
| JP | 2003-172164 | 6/2003 |
| JP | 2003-242567 | 8/2003 |
| JP | 2005-119330 | 5/2005 |
| JP | 2007-062494 | 3/2007 |
| JP | 2007-071370 | 3/2007 |

OTHER PUBLICATIONS

Japanese Office Action dated Jan. 27, 2009, issued in corresponding Japanese Application No. 2007-085241, with English translation.

European Office Action dated Jun. 2, 2010, issued in corresponding European Application No. 08 005 487.7-1254.

Extended European Search Report dated Aug. 12, 2009, issued in corresponding European Application No. 08005487.7-1254.

* cited by examiner

VEHICLE CONTROL SYSTEM AND METHOD

CROSS REFERENCE TO RELATED APPLICATION

This application is based on and incorporates herein by reference Japanese Patent Application No. 2007-85241 filed on Mar. 28, 2007.

FIELD OF THE INVENTION

The present invention relates to a vehicle control system and a method for controlling a vehicle.

BACKGROUND OF THE INVENTION

It is conventionally known (for example, JP 2000-168389A) as one type of vehicle control system to control the switching operation of a gear shift range of an automatic transmission of a vehicle in accordance with a range selecting operation of a shift lever provided in a range selector.

It is furthermore known (for example, JP 2003-242567A) as another type of vehicle control system to control the switching operation of ON/OFF of the engine of a vehicle in accordance with the operation of an ignition key.

Furthermore, in the above two types of control systems, the shift lever and the ignition key are normally provided at different positions of the vehicle. Therefore, when a driver of the vehicle is about to start the engine and move the vehicle, the driver needs to operate the ignition key to turn on the engine, switch the operation target from the ignition key to the shift lever and then select the gear shift range such as D (drive) range or R (reverse) range. Accordingly, the change of the operation target makes a series of vehicle operations before moving of the vehicle cumbersome.

SUMMARY OF THE INVENTION

The present invention therefore has an object to provide a vehicle control system and a method, which simplifies a vehicle operation required to switching engine operation and vehicle operation.

According to the present invention, a vehicle control system comprises a range selector having an operating member operable by a driver of a vehicle, and a shift control device for controlling a switching operation of a shift range of an automatic transmission of the vehicle in accordance with a range selecting operation of the operating member. The vehicle control system further comprises an operation detecting unit for detecting a predetermined engine switching operation of the operating member, and an engine control device for controlling an ON/OFF operation of the engine in accordance with an output of the operation detecting unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
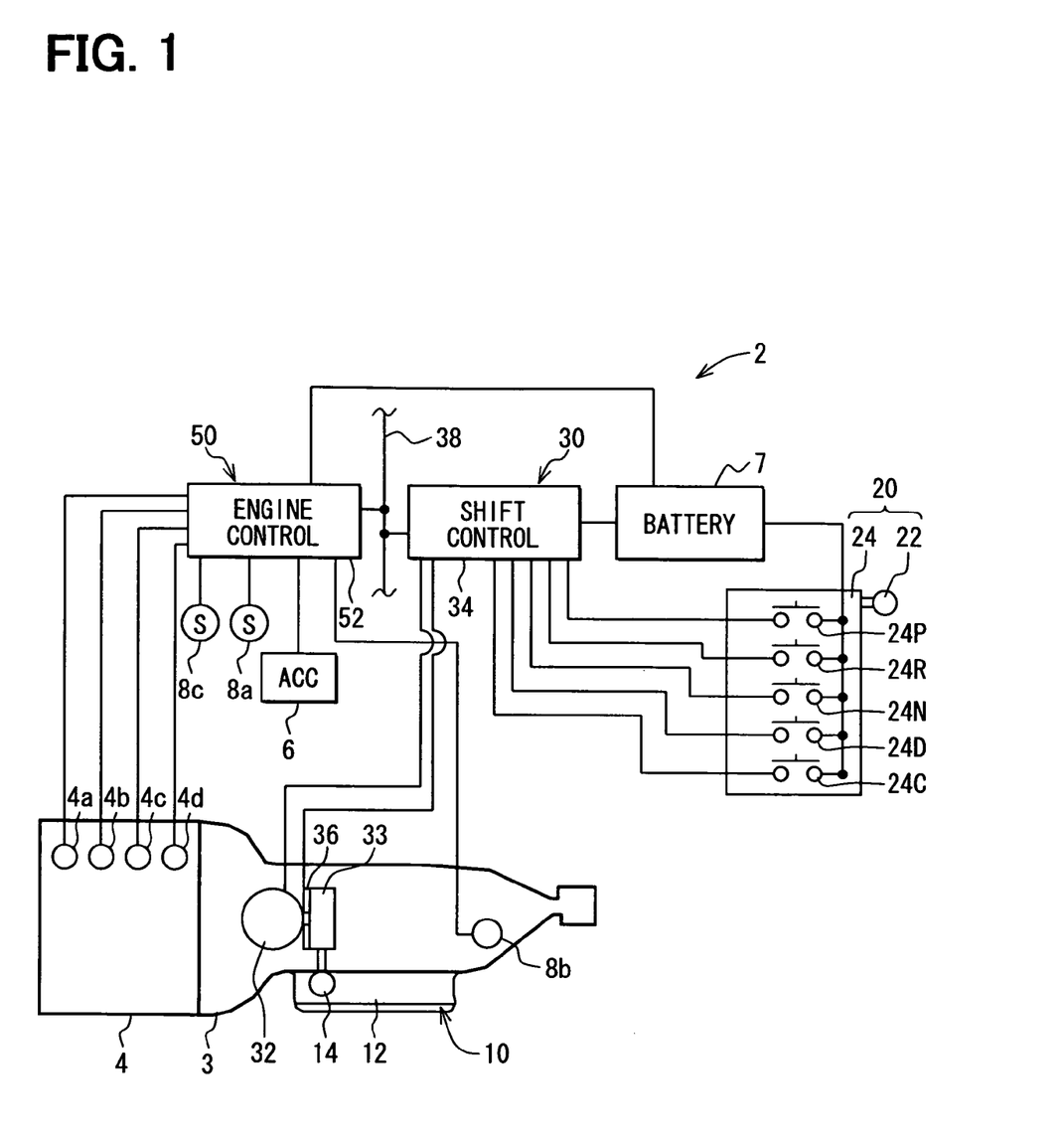
FIG. 1 is a schematic diagram showing a vehicle control system according to a first embodiment of the present invention.
Figure 2:
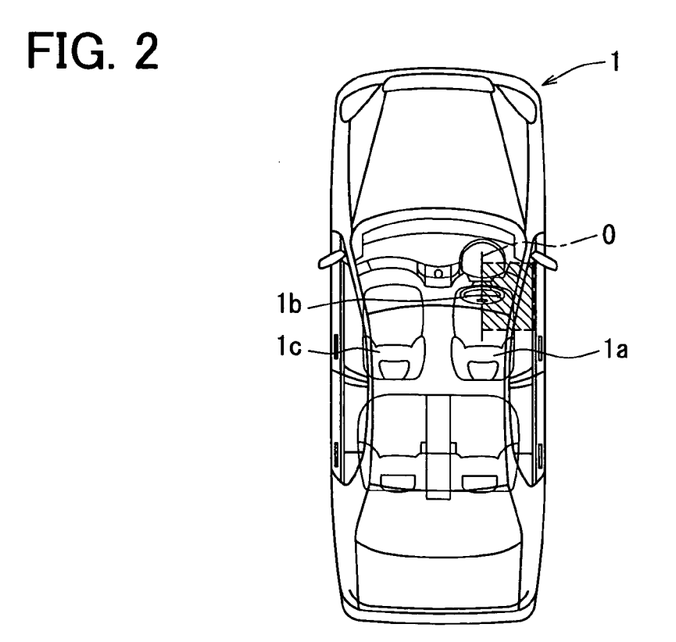
FIG. 2 is a top plan view showing a vehicle in which the first embodiment is mounted.

Referring first to FIGS. 1 and 2, a vehicle control system 2 is mounted in a vehicle 1 together with an automatic transmission 3, an internal combustion engine 4 and an accessory power source 6. The accessory power source 6 turns on/off power supply to accessory equipment of the vehicle 1 such as audio equipment, a room lamp, an auxiliary power source, an air conditioner, etc., for example.

The vehicle control system 2 includes an automatic transmission control device 10, a gear shift range selector 20, a shift control device 30, an engine control device 50, etc.

The automatic transmission control device 10 has a hydraulic circuit 12 for driving the automatic transmission 3. A manual valve 14 of the hydraulic circuit 12 includes a spool valve having a linearly moving spool, and switches the shift range of the automatic transmission 3 by the output hydraulic oil corresponding the shift position of the spool concerned. Here, two kinds of travel ranges of a reverse (R) range and a drive (D) range are provided as a shift range for transmitting the rotational output of the engine 4 to the driving wheel side of the vehicle 1. Furthermore, two kinds of non-travel ranges of a neutral (N) range and a parking (P) range are provided as a shift range which does not transmit the rotational output of the engine 4 to the driving wheel side of the vehicle 1.

The range selector 20 has a shift lever 22 and a shift sensor 24 as an operating member.

Four range selecting positions P, R, N, D at which the shift range of the automatic transmission 3 can be selected are set as the operating position of the shift lever 22. The shift sensor 24 has range detectors 24P, 24R, 24N, 24D which are provided in association with the respective range selection positions P, R, N, D of the shift lever 22. Each of the range detectors 24P, 24R, 24N, 24D is electrically connected to a storage battery 7 mounted in the vehicle 1. Each range detector is turned on to output a detection signal when the shift lever 22 is operated to the corresponding range selection position P, R, N, D, and it is turned off to nullify the output of the detection signal in the other cases. That is, the detection signal of each of the range detectors 24P, 24R, 24N, 24D represents the shift range (selected range) selected by the driver of the vehicle 1 by manually operating the shift lever 22.

A common switch position at which the turn on/off operation of the engine 4 and the accessory power source 6 can be switched is set as an operating position in the shift lever 22, and the shift sensor 24 has a turn on/off detector 24C which is provided in connection with the common switch position. The on/off detector 24C is electrically connected to the battery 7. It is turned on to output a detection signal when the shift lever 22 is operated to the common switch position, and turned off to nullify the output of the detection signal in the other cases.

The shift control device 30 includes a shift actuator 32, a converting mechanism 33 and a shift control computer 34.

The shift actuator 32 is an electrically-driven actuator comprising an electric motor, a reduction gear mechanism, etc., for example, and it is supplied with current to generate a rotational output. The converting mechanism 33 converts the rotational output generated by the shift actuator 32 to a linear motion of the spool of the manual valve 14. Accordingly, the shift range of the automatic transmission 3 is switched in accordance with the rotational position of the shift actuator 32. Therefore, the shift actuator 32 is provided with a rotational position sensor 36 such as a rotary encoder or the like to detect the rotational position representing the actual shift range of the automatic transmission 3 (actual range).

The shift control computer 34 is an electrical circuit which is mainly constructed with a microcomputer. It is electrically connected to the battery 7, the shift actuator 32, the rotational position sensor 36 and the range detectors 24P, 24R, 24N, 24D of the shift sensor 24. The shift control computer 34 controls the rotational position of the shift actuator 32 based on the detection signals of the rotational position sensor 36 and the range detectors 24P, 24R, 24N, 24D to thereby control the switching operation of the shift range of the automatic transmission 3. The control of the switching operation of the shift range may be implemented by a shift-by-wire system.

The shift control computer 34 is further electrically or optically connected to the engine control device 50 through a LAN cable 38. It is also electrically connected to the on/off detector 24C of the shift sensor 24. The shift control computer 34 transmits the detection signals of the detectors 24C, 24R, 24D and the rotational position sensor 36 to the engine control device 50.

The engine control device 50 has an engine control computer 52 which is connected to the shift control computer 34 and receives the detection signals of the detectors 24C, 24R, 24D and the rotational position sensor 36.

The engine control computer 52 is an electrical circuit which is mainly constructed with a microcomputer. It is electrically connected to a brake sensor 8a, a vehicle speed sensor 8b, a seat sensor 8c, the battery 7 and the accessory power source 6 of the vehicle 1. Here, the brake sensor 8a detects the on/off state of the brake of the vehicle 1 based on the operating position of the brake pedal, for example. The vehicle speed sensor 8b detects the travel speed of the vehicle 1 based on rotational number of the rotating shaft of the automatic transmission 3 or the like, for example. The seat sensor 8c provided in a driver seat 1a (FIG. 2) of the vehicle 1 is turned on to output a detection signal when the driver sits on the driver seat 1a. It is turned off to nullify the output of the detection signal when the driver is not seated on the driver seat 1a.

The engine control computer 52 is further electrically connected to electrical components such as a starter 4a of the engine 4, an igniter 4b, a fuel injection valve 4c, an intake throttle 4d, etc. Here, the starter 4a generates the rotational output for starting the engine 4 under stop state by a starting motor. The igniter 4b generates spark discharge for igniting fuel in the cylinder of the engine 4. The fuel injection valve 4c supplies fuel into an intake pipe or cylinder of the engine 4. The intake throttle 4d adjusts the opening degree of the throttle in the intake passage of the engine 4.

The engine control computer 52 controls the ON/OFF switching operation of the electrical components 4a, 4b, 4c, 4d of the engine 4 and the accessory power source 6 based on the detection signals of the detectors 24C, 24R, 24D and the sensors 8a, 8b, 8c, 36. Furthermore, under the ON state of the engine 4 and the accessory power source 6, the engine control computer 52 controls the operation of the electrical components 4b, 4c, 4d in accordance with the operation state of the vehicle 1.

The range selector 20 is preferably provided in a hatched area in FIG. 2, which is located at the opposite side to a front passenger seat 1c next to the driver seat 1a with respect to the center line O of a steering wheel 1b of the vehicle 1. Accordingly, the driver who sits on the driver seat 1a facing the steering wheel 1b is enabled to operate the shift lever 22 of the range selector 20 (lever operation).

Figure 3:
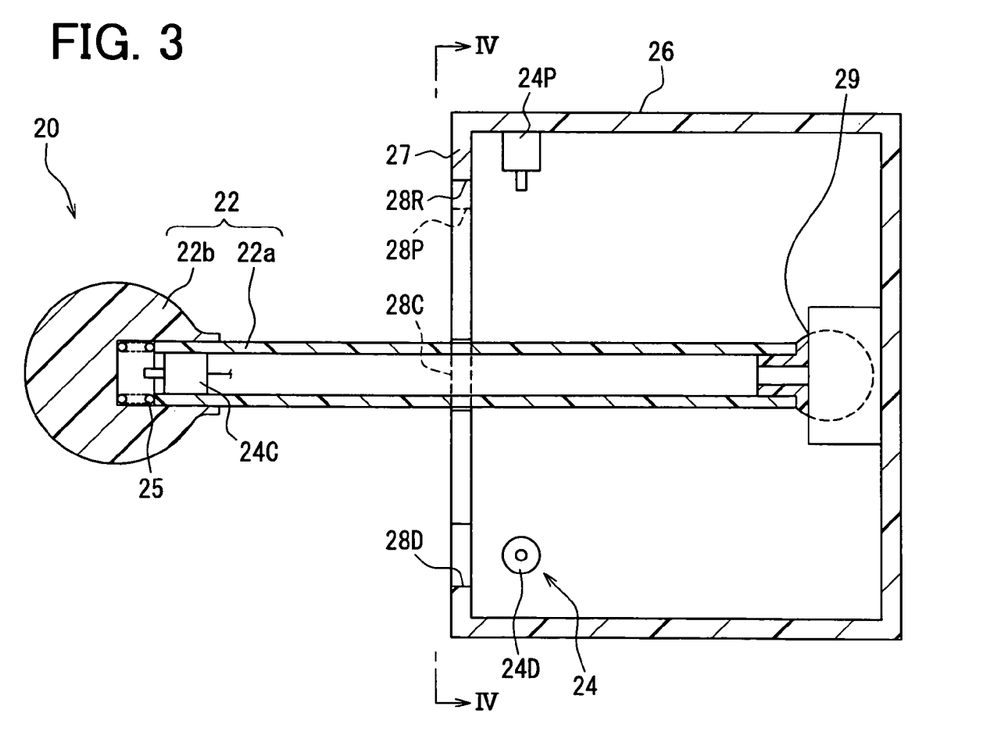
FIG. 3 is a side cross-sectional view showing a gear shift range selector in the first embodiment and taken along a line of III-III in FIG. 4.
Figure 4:
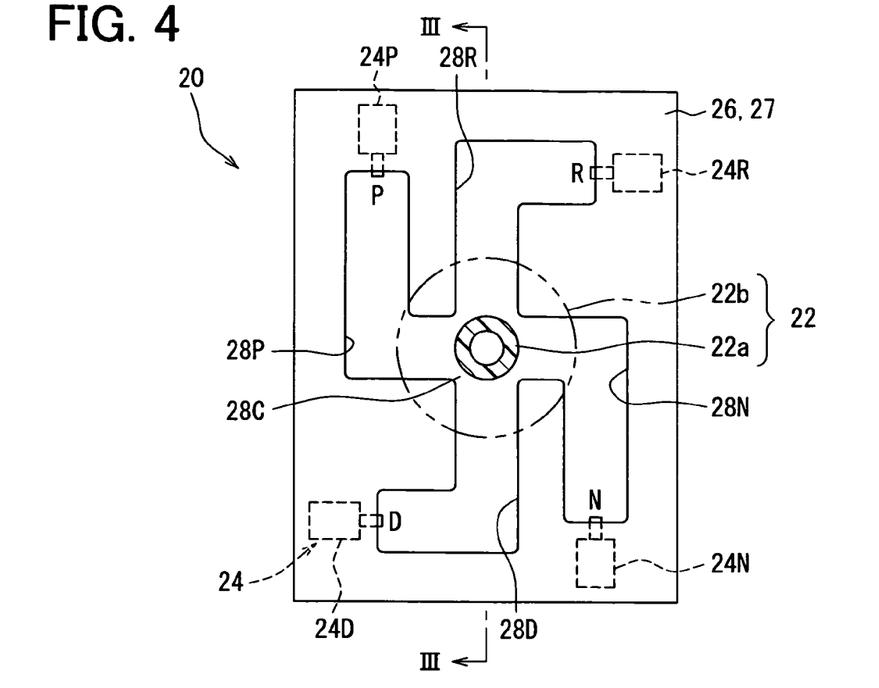
FIG. 4 is a front plan view showing the gear shift range selector in the first embodiment and taken in a direction IV-IV in FIG. 3.

As shown in FIGS. 3 and 4, the range selector 20 has a housing 26 which encases the shift lever 22 and the shift sensor 24. The housing 26 has a rectangular box-like shape, and a guide wall portion 27 is formed by one wall portion exposed to the compartment of the vehicle 1. The guide wall portion 27 has L-shaped groove type guide groove or hole portions 28P, 28R, 28N, 28D, and a central common connection hole portion 28C for connecting one ends of the guide groove portions 28P, 28R, 28N, 28D to one another. The other end portions of the respective guide groove portions 28P, 28R, 28N, 28D which are opposite to the connection hole portion 28C define the corresponding range selection positions P, R, N, D of the shift lever 22.

The shift lever 22 includes a combination of a lever rod 22a and a spherical lever grip 22b which are formed separately from each other.

Figure 5:
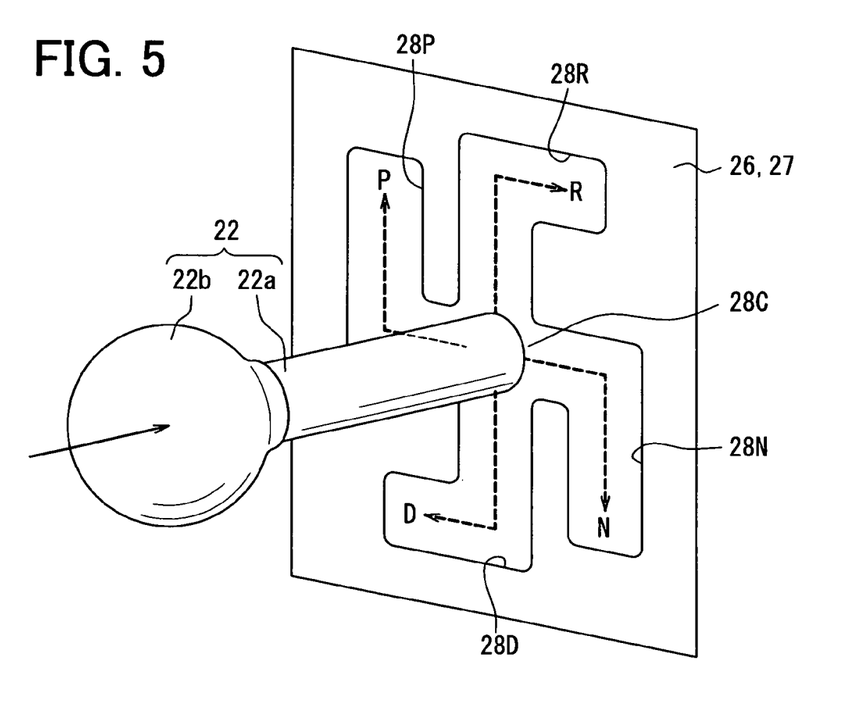
FIG. 5 is a perspective view showing the operation of the gear shift range selector in the first embodiment.

The lever rod 22a has a hollow cylindrical shape, and is disposed so as to penetrate through the guide wall portion 27. One end portion side of the lever rod 22a is inserted in the housing 26, and the one end portion side concerned is supported by a ball joint 29 mounted in the housing 26 so as to be tilted and moved in any direction through the central common connection hole portion 28C relative to the ball joint 29 as a pivot or center of movement. The other end portion side of the lever rod 22a at the opposite side to the ball joint 29 is projected to the outside of the housing 26 to be exposed in the compartment of the vehicle 1. By the urging force of a spring (not shown), the lever rod 22a is fixed in position at a neutral position at which it penetrates through the connection hole portion 28C as shown in FIG. 5 under the state that no operation force in the radial direction acts on the lever rod 22a. On the other hand, when the operation force in the radial direction acts on the lever rod 22a, the lever rod 22a is tilted to any of one of the range selection positions P, R, N, D along any one of the guide groove portions 28P, 28R, 28N, 28D as indicated by a broken-line arrow in FIG. 5. That is, the operation of tilting the lever rod 22a to the range selection positions P, R, N, D corresponds to the lever operation to the range selection positions P, R, N, D.

As shown in FIG. 3, the lever grip 22b has a substantially hollow spherical shape, and the other end portion of the lever rod 22a at the opposite side to the ball joint 29 is engagedly fitted in the lever grip 22b. The lever grip 22b is provided so that it cannot be separated from the lever road 22a and also it can be reciprocated within a predetermined range in the axial direction of the lever rod 22a, which is different and generally perpendicular to the radial direction in which the lever grip 22b is moved to change the shift range. The common switch position of the shift lever 22 is defined to the shift end at the lever rod 22a side of the lever grip 22b concerned. The lever grip 22b is positioned to the shift end at the opposite side to the lever rod 22a by the urging force of a spring 25 under the state that no operation force in the axial direction of the lever rod 22a acts on the lever grip 22b. On the other hand, when the operation force in the axial direction of the lever rod 22a acts on the rod 22a side in the axial direction of the rod (in the solid-line arrow direction) in FIG. 5, the lever grip 22b can be shifted to the common switch position. That is, the operation of moving the lever grip 22b to the common switch position corresponds to the lever operation to the common switch position for instructing switching of engine operations. In order to prevent the lever grip 22b from being operated to the common switch position by erroneous operation, the stroke length from the shift end based on the spring 25 to the common switch position is set to be as long as possible.

As shown in FIGS. 3 and 4, each of the range detectors 24P, 24R, 24B, 24D of the shift sensor 24 is a limit switch or the like, for example, and it is positioned and accommodated in the housing 6. Each range detector 24P, 24R, 24N, 24D is turned on by detecting the lever rod 22a which reaches the range selection positions P, R, N, D of the corresponding guide groove portions 28P, 28R, 28N, 28D. It is turned off when the lever rod 22a is separated from the range selection position concerned.

As shown in FIG. 4, the on/off detector 24 of the shift sensor 24 is a limit switch, for example, and it is positioned and accommodated in the lever rod 22a. The on/off detector 24C is turned on by detecting the lever grip 22b which is pressed to the shift end at the lever rod 22a side, that is, to the common switch position to instruct switching of the engine operation between ON and OFF. It is turned off when the lever grip 22b is separated from the common switch position. The on/off detector 24C in the lever road 22a which is tilted with respect to the housing 26 is electrically connected to the battery 7 and the shift control computer 34 by implementing contact-less power supply and signal transmission in the ball joint 29, for example.

Next, the control of the switching operation of the shift range by the shift control computer 34 will be described in detail. This switching control is performed according to the control flow shown in FIG. 6, and the shift control computer 34 executes a computer program during the period from the riding of a passenger till drop-off, thereby repetitively executing the switching operation every predetermined period.

Figure 6:
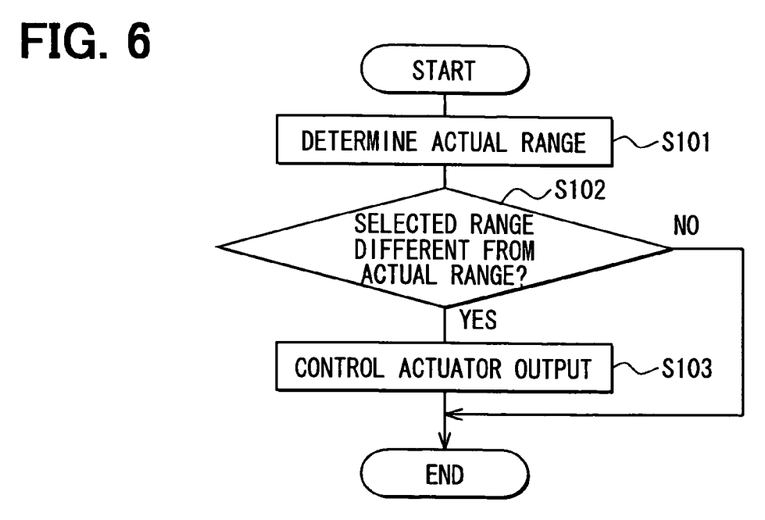
FIG. 6 is a flowchart showing switching control processing of the shift range by a shift control computer in the first embodiment.

First, in step S101, the actual range of the automatic transmission 3 is determined based on the detection signal of the rotational position sensor 36. Subsequently, in step S102, it is checked which one of the range detectors 24P, 24R, 24N, 24D outputs the detection signal corresponding to the selected range different from the determined actual range.

When a positive determination (YES) is made in step S102, the processing shifts to step S103. In this step S103, the rotational output of the shift actuator 32 is controlled so that the rotational position represented by the detection signal of the rotational position sensor 36 is coincident with the rotational position corresponding to the selected range. As a result, the actual range of the automatic transmission 3 is switched to the selected range, and then the processing ends and returns to step S101.

On the other hand, when a negative determination (NO) is made in step S102, the processing skips step S103 and ends and returns to the step S101.

Next, the on/off switching control of the engine 4 and the accessory power source 6 by the engine control computer 52 will be described in detail. This switching control is based on the control processing shown in FIG. 7. The engine control computer 52 executes the computer program during the period from getting-in of the driver till getting-off of the driver, thereby repeating the on/off switching control.

Figure 7:
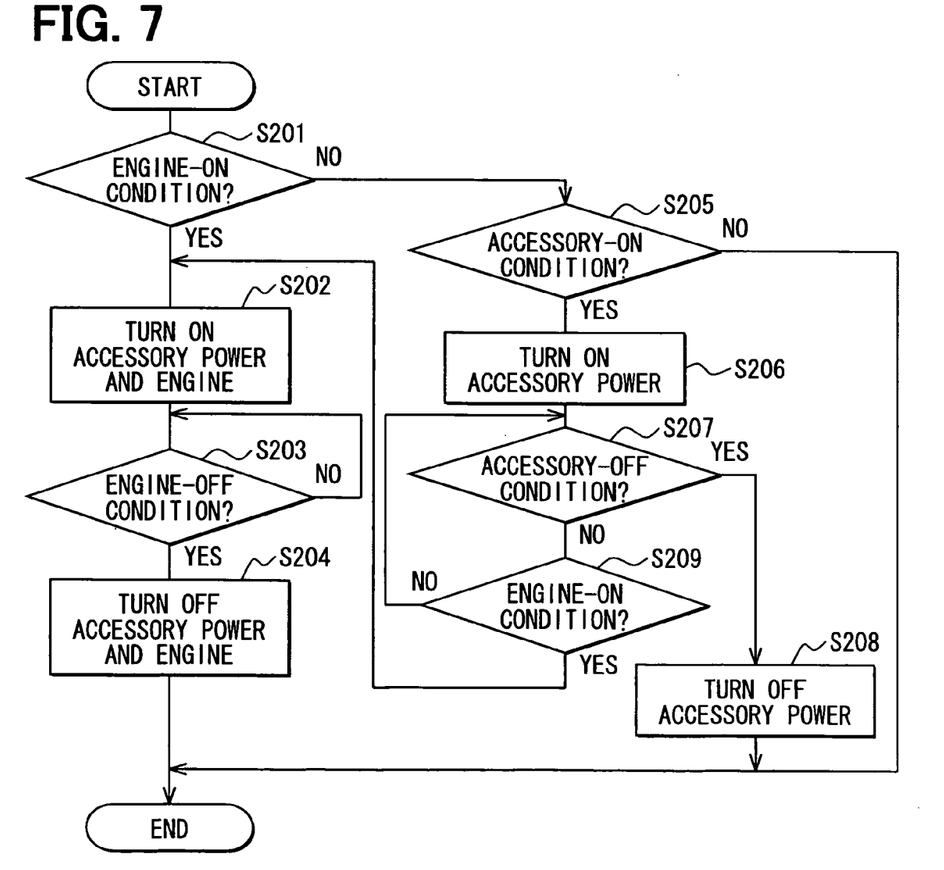
FIG. 7 is a flowchart showing switching control processing of ON/OFF of the engine and an accessory power source by an engine control computer in the first embodiment.

First, in step S201, it is checked based on the respective detection signals of the detectors 24C, 24R, 24D and the brake sensor 8a whether any one of the following engine-on conditions EON1, EON2 is satisfied under the condition that both the engine 4 and the accessory power source 6 are turned off. Here, with respect to the engine-on condition EON1, in order to prevent erroneous determination caused by erroneous operation of the lever grip 22b, it is finally determined that the on/off detector 24C is turned on when there are plural ON-inputs from the on/off detector 24C during a set time or when the on-state of the on/off detector 24C is continued for the set time, for example.

(EON1) Under the state that the brake of the vehicle 1 is set to ON, the on/off detector 24C is turned on by operating the lever 22a to the common switch position.

(EON2) Under the state that the brake of the vehicle 1 is set to ON, one of the range detectors 24R, 24D is turned on by operating the lever to one of the range selection positions R, D.

When a positive determination is made in step S201, the processing shifts to step S202. In this step S202, the accessory power source 6 is turned on to supply power to accessory equipment of the vehicle 1, and the electrical components 4a, 4b, 4c, 4d of the engine 4 are turned on to crank the engine 4, thus attaining complete combustion of fuel in the engine 4. The starter 4a out of the electrical components of the engine 4 is turned off by self-control after the engine 4 attains complete combustion. Subsequently, in step S203, it is checked based on the respective detection signals of the on/off detector 24C and the sensors 8b, 36, 8c whether any one of the following engine-off conditions EOFF1, EOFF2, EOFF3 is satisfied under the condition that both the engine 4 and the accessory power source 6 are turned on. Here, with respect to the engine-off conditions EOFF1, EOFF2, as in the case of the engine-on condition EON1, it is finally determined that the on/off detector 24C is turned on when there are plural on-inputs from the on/off detector 24C during a set time or when the on-state of the on/off detector 24C is continued for the set time, for example.

(EOFF1) Under the state that the travel speed of the vehicle 1 is equal to zero, the on/off detector 24C is turned on by operating the lever 22 to the common switch position.

(EOFF2) Under the state that the actual range is set to one of the P range and the N range, the on/off detector 24C is turned on by operating the lever 22 to the common switch position.

(EOFF3) Under the state that the actual range is set to the P range, the seat sensor 8c is turned off when the driver leaves the driver seat 1a.

The processing of step S203 is repetitively executed until a positive determination is made. If the positive determination is made in step S203, the processing shifts to step S204. In this step S204, the engine 4 is stopped by turning off the electrical components 4b, 4c, 4d of the engine 4, and the power supply to the accessory equipment is stopped by turning off the accessory power source 6. Thus, the processing ends and returns to step S201.

If a negative determination (NO) is made in step S201, the processing shifts to step S205. In this step S205, it is checked based on the respective detection signals of the on/off detector 24C and the brake sensor 8a whether the following accessory-on condition AON is satisfied under the condition that both the engine 4 and the accessory power source 6 are turned off. Here, with respect to the accessory-on condition AON, as in the case of the engine-on condition EON1, it is finally determined that the on/off detector 24C is turned on when there are plural ON inputs from the on/off detector 24C during a set time or when the ON-state of the on/off detector 24C is continued for the set time, for example.

(AON) Under the state that the brake of the vehicle 1 is set to the OFF state, the on/off detector 24C is turned on by operating the lever 22 to the common switch position.

When a negative determination is made in step S205, the processing ends and returns to step S201. If a positive determination is made in step S205, the processing shifts to step S206. In this step S206, power is supplied to the accessory equipment by turning on the accessory power source 6 while the electrical components 4a, 4b, 4c, 4d of the engine 4 are kept turned off. Subsequently, in step S207, it is checked based on the respective detection signals of the on/off detector 24C and the sensors 8b, 36, 8c whether any one of the accessory-off conditions AOFF 1, AOFF 2, AOFF 3 which are the same as the engine-off conditions EOFF1, EOFF2, EOFF3 is established under the condition that the engine 4 is turned off and the accessory power source 6 is turned on.

If a positive determination is made in step S207, the processing shifts to step S208. In this step S208, the power supply to the accessory equipment is stopped by turning off the accessory power source 6, and then the processing ends and returns to step S201.

On the other hand, if a negative determination is made in step S207, the processing shifts to step S209. In this step S209, it is checked whether any one of the engine-on conditions EON1, EON2 is satisfied as in the case of the step S201. As a result, if a negative determination is made, the processing returns to step S207. If a positive determination is made, the processing shifts to step S202 to execute subsequent steps.

According to the first embodiment as described above, the driver of the vehicle 1 can start the engine 4 according to the following two methods to move the vehicle 1.

According to a first method, the engine 4 is turned on by pushing the lever grip 22b of the shift lever 22 to the common switch position under the state that the brake of the vehicle 1 is set to ON, and then the lever rod 22a of the shift lever 22 is tilted to the range selection positions R, D to switch to desired gear shift ranges R, D for vehicle travel. As a result, the turn-on of the engine 4 and the switching to the ranges R, D are successively implemented in sequence as different operations of the same shift lever 22 by one hand. Thus, the vehicle operation method could be simplified. Further, since the vehicle operation itself is unchanged although the prior and existing vehicle operation method is changed, the driver is released from uneasiness.

According to a second method, under the state that the brake of the vehicle 1 is set to ON, the lever rod 22a of the shift lever 22 is tilted till the range selection positions R, D to implement both the turn-on of the engine 4 and the switching to the travel ranges R, D. If the turn-on of the engine 4 and the switching to the travel ranges R, D are implemented substantially at the same time by the same operation of the same shift lever 22 as described above, the vehicle operation method can be further simplified. In addition, it is based on the assumption of setting the brake to ON that the engine 4 is turned on substantially at the same time as the switching to the ranges R, D by operating the shift lever 22 to the range selection positions R, D. Thus, sudden acceleration of the vehicle 1 unintended by the driver can be prevented.

Furthermore, when the engine 4 to be on-started according to these methods is daringly or intentionally not started and only the accessory power source 6 is to be turned on, the driver pushes the lever grip 22b of the shift lever 22 to the common switch position under the state that the brake of the vehicle 1 is set to OFF. According to this method, the accessory equipment can be used by turning on the accessory power source 6 without starting the engine 4 as in the conventional case. Therefore, the sense of discomfort which the driver feels because of the change of the vehicle operation method can be reduced. In addition, the turn-on of the accessory power source 6 and the turn-on of the engine 4 are implemented by the same operation of the shift lever 22 in the vehicle 1 under different brake states, and the turn-off of the accessory power source 6 and the turn-off of the engine 4 are implemented by the same operation of the shift lever 22 in the vehicle 1 under the same travel speed state or the same range state, so that the simplification of the vehicle operating method can be promoted.

In addition, it is difficult for the fellow passenger on the front passenger seat 1c to reach the shift lever 22 of the range selector 20 which is provided at the opposite side to the front passenger seat 1c with respect to the center of the steering wheel 1b of the vehicle 1. Accordingly, when the passenger of the seat 1c is a child, it is prevented that the child operates the shift lever 22 for a lark to start moving of the vehicle 1 erroneously.

In the first embodiment, the lever operation to the range selection positions P, R, N, D corresponds to a range selecting operation, the lever operation to the range selection positions R, D corresponds to the a travel range selecting operation, the shift control device 30 for executing the steps S101 to S103 of FIG. 6 by the shift control computer 34 corresponds to the a shift control device, and the shift control computer 34 corresponds to a shift control circuit. Furthermore, the lever operation to the common switch position under the on-state of the brake of the vehicle 1, the travel-speed zero state of the vehicle 1 and the P, N state of the actual range, and the lever operation to the range selection positions R, D under the on-state of the brake correspond to the an engine switch operation, and the lever operation to the common switch position under the on-state of the brake and the lever operation to the range selection positions R, D under the on-state of the brake correspond to an engine-on operation, and an engine control device 50 for executing the steps S201 to 204, 5209 of FIG. 7 by the engine control computer 52 corresponds to an engine control device. Furthermore, the lever operation to the common switch position under the off-state of the brake of the vehicle 1, the travel speed zero state of the vehicle 1 and the P, N state of the actual range correspond to the an accessory power supply operation, and the engine control device 50 for executing the steps S205 to S209 of FIG. 7 by the engine control computer 52 corresponds to an accessory power supply control device.

Second Embodiment

Figure 8:
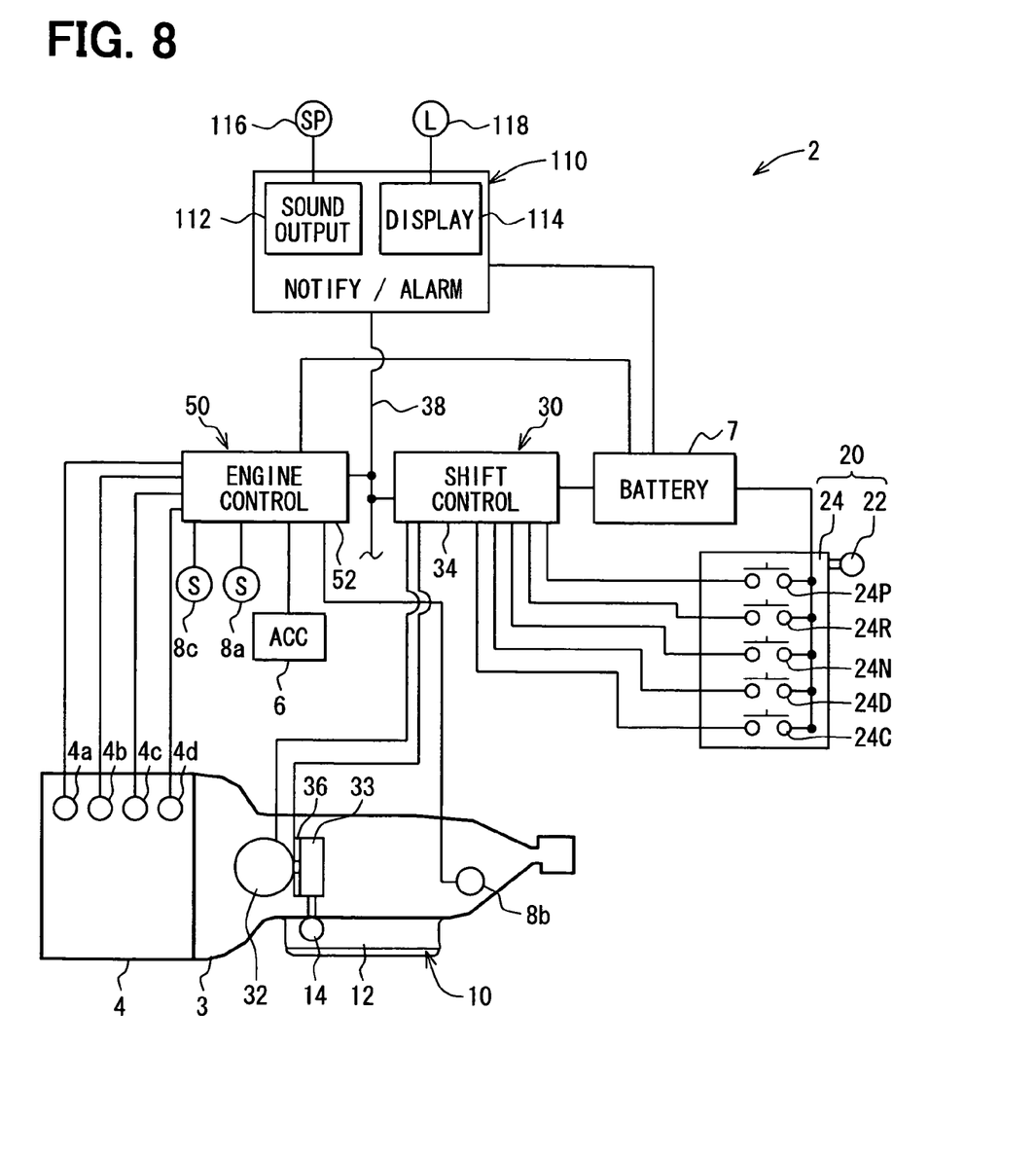
FIG. 8 is a block diagram showing a vehicle control system according to a second embodiment of the present invention.

In a second embodiment, as shown in FIG. 8, a notifying/alarming device 110 is electrically or optically connected to the LAN line 38 common to the shift control computer 34 and the engine control computer 52, and it is electrically connected to the battery 7. The notifying/alarming device 110 has a sound output portion 112 and a display portion 114. The sound output portion 112 outputs sounds through a speaker 116 provided in the compartment of the vehicle 1. The display portion 114 turns on/off a display lamp 118 provided to the shift lever 22 so that the driver seating on the driver seat 1a can visually recognize the display lamp 118.

The engine control computer 52 of the engine control device 50 controls the notifying/alarming device 110 to notify the method of the lever operation to the driver and also issue an alarm for promoting the lever operation to the driver. The control of the notifying/alarming device 110 by the engine control computer 52 is executed by the control processing shown in FIG. 9. For example, the engine control computer 52 executes the computer program to execute the above control every time a door of the vehicle is unlocked from the outside of the vehicle 1.

Figure 9:
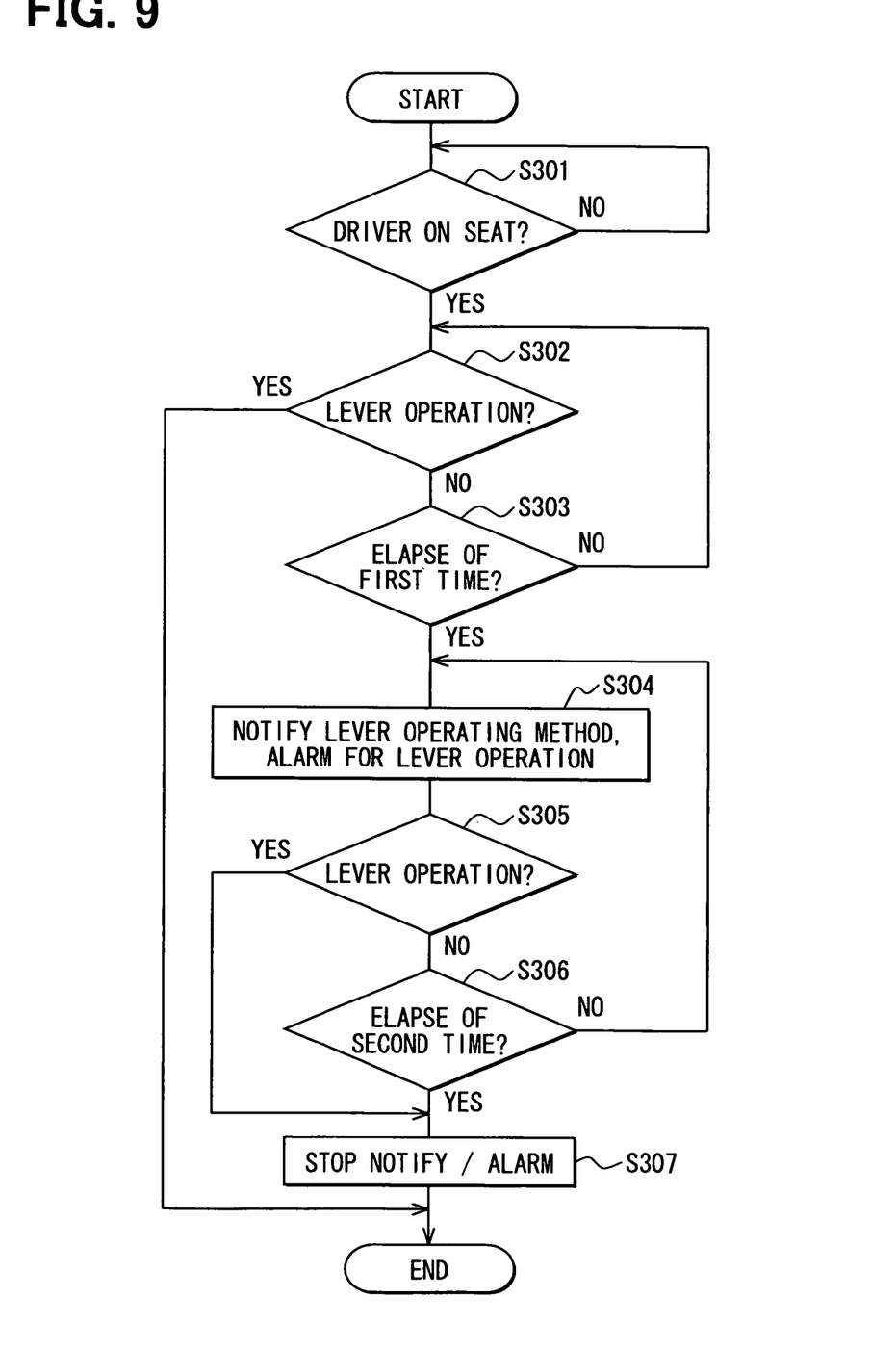
FIG. 9 is a flowchart showing control processing of notifying/alarming device by an engine control computer in the second embodiment.

First, in step S301, it is checked whether the driver sits on the seat. Here, whether the driver gets in a vehicle or not may be made by checking whether the driver sits on the driver seat 1a and thus the seat sensor 8c is turned on.

The step S301 is repetitively executed until a positive determination (YES) is made in step S301. If the positive determination is made in step S301, the processing shifts to step S302. In this step S302, it is checked whether a specific lever operation is detected by the shift sensor 24. Here, specifically, it is checked whether any one of the following detection events DE1, DE2 occurs.

(DE1) The on/off detector 24C is turned on by the lever operation to the common switch position which results in the engine-on condition EON1 and the accessory-on condition AON.

(DE2) One of the range detectors 24R, 24D is turned on by the range operation to one of the range selection positions R, D which results in the engine-on condition EON2.

When a negative determination (NO) is made in step S302, the processing shifts to step S303. In this step S303, it is checked whether a first set time T1 elapses from the first step S302 after the step S301. That is, in the step S303, it is checked whether the non-detection state of the specific lever operation in which neither the detection event DE 1 nor the detection event DE 2 occurs is continued for the set time T1. The set time T1 may be set to a proper value, and for example it is set to about 5 seconds.

If the negative determination is made in step S303, the processing returns to step S302. However, if the positive determination is made in step S303, the processing shifts to step S304. In this step S304, the lever operating method is notified with sounds by controlling the sound output portion 112 of the notifying/alarming device 110. At the same time, in step S304, the display lamp 118 is blinked at a predetermined period by controlling the display portion 114 of the notifying/reporting device 110, thereby issuing an alarm for promoting the lever operation.

Thereafter, in step S305, as in the case of the step S302, it is checked whether the specific lever operation is detected by the shift sensor 24. Furthermore, in step S306, it is checked whether a second set time T2 elapses from the step S340 after the step S303. The set time T2 may be set to a proper value, and for example it is set to about 30 seconds.

If the negative determination is made in both the steps S305 and S306, the processing returns to the step S304. However, if the positive determination is made in any one of the steps S305, S306, the processing shifts to step S307. In this step S307, the sound output portion 112 and the display portion 114 are controlled to stop the notification of the lever operating method and the alarm, and then this control flow is finished.

The foregoing description is associated with the case where the negative determination is made in step S302. However, when the positive determination is made in step S302, that is, when any one of the above detection events DE1, 2 occurs within the first set time T1 from the time when the driver gets in the vehicle, the step S303 and the steps subsequent thereto are skipped, and this control flow is finished. Accordingly, in this case, the notification of the lever operating method and the alarm are prohibited.

According to the second embodiment, when the non-detection state of the specific lever operation by the shift sensor 24 is continued for the first set time T1 from the time when the driver gets in the vehicle, the notification of the lever operating method and the alarm are given to the driver. Accordingly, even when the driver cannot operate the shift lever 22 and thus feels puzzled and disturbed because the driver is unfamiliar with the new operating method to which the conventional and existing operating method is changed or the like, the driver can quickly get free of the disturbed state by the notification of the lever operating method and the alarm. Accordingly, the driver is released from being continuously puzzled and disturbed.

When the specific lever operation is detected by the shift sensor 24 within the first set time T1 from the time when the driver gets in the vehicle, the notification of the lever operation method and the alarm adversely induces unpleasantness to the driver, and thus the notification of the method and the alarm are prohibited. Further, the worsening of the driving feeling due to the change of the vehicle operation method can be suppressed to the minimum level, and friendliness to users can be secured.

In the second embodiment, the shift sensor 24 corresponds to an operation detecting unit, and the engine control device 50 for executing the steps S301 to S307 of FIG. 9 by the engine control computer 52 and the notifying/alarming device 110 correspond to an operation notifying unit. Furthermore, the engine control device 50 for executing the steps S201 to S204, S209 of FIG. 7 by the engine control computer 52 corresponds to an engine control device, and the engine control device 50 for executing the steps S205 to S209 of FIG. 7 by the engine control computer 52 corresponds to an accessory power supply control device.

Other Embodiments

The above embodiments may be modified in many ways.

For example, in the first and second embodiments, with respect to the shift range of the automatic transmission 3 and the range selection positions of the range selector 20, "Low" (L) or the like may be added as the travel range and the range selection position in addition to P, R, N, D, for example. Furthermore, with respect to the construction of the shift lever 22, the common switch position may be implemented by pulling the lever grip 22b to the opposite side to the lever rod 22a or twisting or turning the lever grip 22b with respect to the lever rod 22a. Still furthermore, with the arrangement place of the shift lever 22, it may be set to be nearer to the front passenger seat 1c side than the steering 1b as long as it may not be easily manipulated by the passenger other than the driver.

In the first and the second embodiments, the detection signals of the sensors 24, 36 may be directly transmitted to the engine control computer S100, 52 of the engine control device 50 without being passed through the shift control computer 34 of the shift control device 30. Furthermore, in the first and second embodiments, as the construction of the shift control device 30, the spool of the manual valve 14 may be mechanically made to make a linear motion by a mechanism linked to the shift lever 22. In this case, the shift control computer 34 is not necessarily required, and the shift control computer 34 may be excluded from the constituent elements of the shift control device 30 by directly transmitting the detection signals of the sensors 24, 36 to the engine control computer S100, 52.

In the first and second embodiments, the on/off switching control of the engine 4 and the accessory power source 6 and the control of the notifying/alarming device 110 may be executed by the shift control computer 34. In this case, the on/off switching control of the engine 4 and the accessory power source 6 may be implemented by transmitting a control instruction to the engine control computer 52, for example.

In the first and second embodiments, the engine-on condition may be limited to any one of EON1 and EON2, or the engine-off condition may be limited to any one or two of EOFF1, EOFF2, EOFF3. Furthermore, the lever operation to the common switch position which constitutes the accessory-on condition AON may be replaced by the lever operation to the range selection position N, for example. Still furthermore, the accessory-off condition may be limited to any one or two of AOFF1, AOFF2, AOFF3 which are the same as the engine-off conditions EOFF1, EOFF2, EOFF3, or a condition different from the engine-off conditions EOFF1, EOFF2, EOFF3 may be adopted.

In the second embodiment, at least one of the notification of the lever operating method and the alarm for promoting the lever operation may be implemented by displaying an image on a navigation monitor. Whether the driver gets in the vehicle may be checked by whether the driver sits on the driver seat 1a. However, in place of this method, it may be checked by whether the door on the driver seat side is opened and closed after the door lock is released from the outside of the vehicle 1, for example.

What is claimed is:

1. The vehicle control system comprising:
    a range selector having an operating member operable by a driver of a vehicle;
    a shift control device for controlling a switching operation of a shift range of an automatic transmission of the vehicle in accordance with a range selecting operation of the operating member;
    an operation detecting unit for detecting a predetermined engine switching operation of the operating member;
    an engine control device for controlling an ON/OFF operation of the engine of the vehicle in response to an output of the operation detecting unit; and
    an operation notifying unit for notifying a method of operating the operating member when the operation detecting unit detects no predetermined engine switching operation of the operating member for a set time after an entrance of a driver into the vehicle.

2. The vehicle control system according to claim 1, wherein the operation notifying unit prohibits notification of the method of operating the operating member, when the operation detecting unit detects the predetermined engine switching operation within the set time.

3. The vehicle control system according to claim 1, wherein the operation notifying unit further issues an alarm for promoting the predetermined engine switching operation by the operating member.

4. A vehicle control system comprising:
    a range selector having an operating member operable by a driver of a vehicle and operable to perform a range selection operation and a non-range selection operation, the range selecting operation being for shifting the operating member to select a travel range and a non-travel range as shift ranges of an automatic transmission of vehicle, and the non-range selecting operation being for shifting the operating member to a common switch position of the operating member as a different operation from the range selection operation;
    a shift control device for controlling a switching operation of a shift range of the automatic transmission in accordance with the range selecting operation;
    an engine control device for controlling an ON/OFF operation of an engine of the vehicle in response to an engine switch operation of the operating member; and
    an accessory power supply control device for controlling ON/OFF operation of an accessory power source of the vehicle in response to an accessory power supply operation of the operating member;
    wherein the shift control device switches the shift range to the travel range at the same time as the engine control device turns on the engine, when the operating member is shifted to select the travel range as the engine switch operation under a condition that a brake is applied to the vehicle,
    wherein the shift control device switches the shift range to the travel range, when the operating member is shifted to the travel range as the range selection operation after the engine control device turned on the engine, in case that the operating member is shifted to the common switch position as an engine ON operation as the engine switch operation under the condition that the brake is applied to the vehicle,
    wherein the accessory power supply control device turns on the accessory power source when the operating member is shifted to the common switch position as the accessory power supply operation under the condition that the brake is applied to the vehicle,
    wherein the engine control device turns off the engine, which is in an ON condition, when the operating member is shifted to the common switch position as the engine switch operation, and
    the accessory power supply control device turns off the accessory power source, which is in an ON condition relative to an OFF condition of the engine, when the operating member is shifted to the common switch position to indicate an accessory power supply turn-off condition under a vehicle travel speed condition, which is the same as the engine OFF condition or under a shift range condition, which is the same as the engine OFF condition.

* * * * *